United States Patent [19]

Wilmes

[11] 4,253,629
[45] Mar. 3, 1981

[54] GUIDING AND MARKING MEMBER FOR ELECTRICAL CABLES

[75] Inventor: Manfred Wilmes, Detmold, Fed. Rep. of Germany

[73] Assignee: C.A. Weidmüller KG, Detmold, Fed. Rep. of Germany

[21] Appl. No.: 50,850

[22] Filed: Jun. 21, 1979

[30] Foreign Application Priority Data

Sep. 4, 1978 [DE] Fed. Rep. of Germany ... 7826230[U]

[51] Int. Cl.³ ............................................. F16L 3/22
[52] U.S. Cl. .................................. 248/68 R; 174/112
[58] Field of Search ............... 248/68 R, 74 R, 74 A, 248/74 PB, 68 CB, 65; 24/249 R, 255 SL, 256, 257, 16 R, 16 PB, 81 CC, 73 PB; 174/112; 40/316

[56] References Cited

U.S. PATENT DOCUMENTS

| 3,459,878 | 8/1969 | Gressitt et al. | 40/316 X |
|---|---|---|---|
| 3,659,319 | 5/1972 | Erickson | 248/74 A X |
| 3,749,820 | 7/1973 | Langlie | 248/74 A X |
| 3,861,015 | 1/1975 | Hooven | 248/74 A X |
| 3,890,459 | 6/1975 | Caveney | 248/68 R X |
| 3,916,089 | 10/1975 | Sloan | 248/74 A X |
| 3,977,104 | 8/1976 | Stupar | 4 0/316 X |
| 4,037,810 | 7/1977 | Pate | 248/74 PB X |
| 4,118,838 | 10/1978 | Schiefer | 248/68 CB X |
| 4,168,423 | 9/1979 | Gilreath | 248/74 A X |

FOREIGN PATENT DOCUMENTS

| 883005 | 7/1953 | Fed. Rep. of Germany | 174/112 |
|---|---|---|---|
| 1102841 | 3/1961 | Fed. Rep. of Germany | 174/112 |

Primary Examiner—J. Franklin Foss

[57] ABSTRACT

A guiding and marking member for electric cables has a plurality of resiliently deformable wings on one side of a support plate and their ends converge in V configuration to define a cable holder adjacent to the plate and an insertion slit spaced from the plate which merges into the cable holder. The cable holder wing ends lightly grip the inserted cable. On its other side the support plate has latching receptacles into which marking plates are detachably latched.

3 Claims, 3 Drawing Figures

GUIDING AND MARKING MEMBER FOR ELECTRICAL CABLES

This invention relates to a guiding and marking member for electrical cables.

Guiding and marking members of this kind are provided for the ordered combination and marking of electrical cables, more particularly in wiring systems. Known guiding and marking members comprise two substantially identical profiled strips which can be latched to each other, each being of bridge-like form having semi-cylindrical recesses arranged in such a way that, after being latched to each other the strips form cylindrical adjacent holders for fastening cables side by side. The outer side of at least one of the strips is provided with markings, for example numberings, to designate the individual cables.

If individual cables have to be removed from such a guiding and marking member in the course of modification of the wiring system, it will in general be necessary for the two strips to be unlatched because the plugs, terminations and the like normally provided at the cable ends cannot be pulled through the holders formed by the interlatched strips, so that substantially all the cables are exposed. This is particularly the case when removing cables situated in the middle region, and the cables can therefore drop out from the remaining strip, making it necessary to restore the cables to their orderly arrangement when the strips are again latched to each other, which is very inconvenient.

Furthermore, to ensure that the two strips can be reliably and simply latched to each other, the cables are disposed in their holders with some clearance. This can result in the guiding and marking member sliding along the cables from its initial accessible and visible position into an inaccessible and invisible position, in which the cable markings can no longer be recognized, more particularly if the place of use is subject to vibration.

It is the object of the present invention to provide a guiding and marking member for electric cables in which individual cables can be removed in the simplest possible manner without impairing the guiding of the other cables.

According to one aspect of the invention there is provided a guiding and marking member for electric cables, having a support plate and a plurality of resiliently deformable wings disposed on the support plate which wings have ends which converge in V configuration and define a cable holder and on the side distal from the support plate define a cable-insertion slit which merges into the cable holder.

With this construction it is possible for cables to be inserted individually and independently of each other through the slit between the two wings into the defined conductor holder while the wing material is resiliently deformed, and, if necessary, such cable can also be removed from that position without disturbing the remaining cables. The cable holder is conveniently dimensioned so that the conveying wing ends secure the inserted cable. Given suitable dimensioning, the converging wing ends will have a slight resilient grip on the conductor. The grip in each individual cable holder can be slight because the totality of the gripping actions in all the cable holders leads to a very reliable positional location of the guiding and marking member on the cables, so that the said guiding and marking member is not displaced from its intended position even if the system is subject to vibrational stresses. The markings therefore remain readily visible at all times.

One embodiment of the invention will be described hereinbelow with reference to the accompanying drawing in which.

Figure 1:
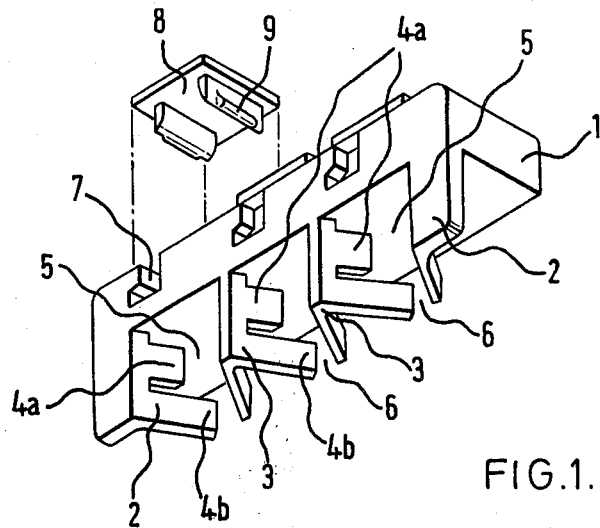
FIG. 1 is a perspective view of a cable guiding and marking member according to the invention.
Figure 2:
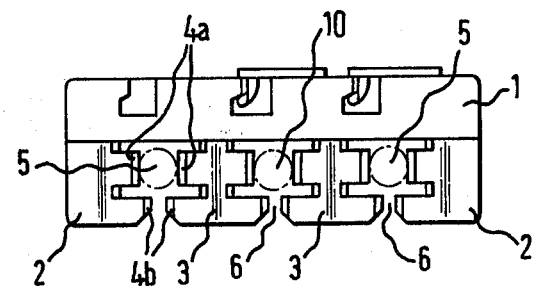
FIG. 2 shows the guiding and marking member according to FIG. 1 in side view.
Figure 3:
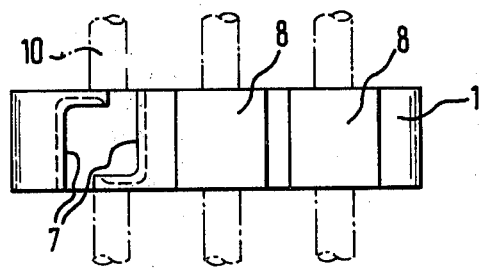
FIG. 3 shows the guiding and marking member according to FIG. 1 in plan view.

The illustrated guiding and marking member for electric cables 10 comprises an elongate support plate 1 of molded plastic material the underside of which is provided with a plurality of resiliently deformable wings 2 and 3.

Each wing comprises a post integral with the plate 1 and projecting perpendicular to the lower face of the plate at one of the longer sides of the latter. Each post has one or two pairs of projecting ends 4a, 4b; the wings 2 at the ends of the plate have one such pair whereas each intermediate wing 3 has two such pairs diverging from the post. The projecting ends of adjacent posts converge, towards their free tips, in V configuration. The projecting wing ends 4a nearer the plate 1 are shorter than the projecting ends 4b further from the plate and define between adjacent tips apertures 5 for holding respective cables 10. The wing ends 4b define slits 6, narrower than the cable holders 5 and merging into the latter, through which slits the cables are inserted into the holders 5, flexing the ends 4b in passing through the slits 6. The projecting ends 4a and 4b can flex independently of each other and of the plate 1.

The converging wing ends are so dimensioned that the converging ends 4a have a slight clamping action on the external surface of the inserted cable and thus contribute to holding the guiding and marking member in position on the inserted cables.

The cables are inserted into the appropriate cable holders 5 by substantial resilient deformation of the wing ends 4b in the region of the insertion slit 6 and by slight deformation of the wing ends 4b in the region of the cable holder 5.

On the side opposite to the wings, forming the top of the guiding and marking member, the support plate 1 is provided with latching receptacles 7 into which marking plates 8 can be latched by means of teeth 9 on the underside in such a way that the marking plates 8 are detachably disposed in the latching receptacles 7. This makes it possible for the cables to be renumbered or remarked by exchanging or resetting the marking plates 8.

I claim:

1. A guiding and marking member adapted to be clipped onto one or more electrical cables, said member comprising
   (a) a support plate;
   (b) a plurality of posts on said support plate and generally perpendicular to a face of said support plate;
   (c) each post having resilient lateral projections extending adjacent to said face and having free tips;
   (d) respective said projections of adjacent posts converging in the direction of their said free tips and defining between said free tips
      (i) a slit for insertion of a cable, and
      (ii) an aperture, wider than and communicating with said slit, and located between the latter and said face, for holding an inserted cable;

(e) each said post having at least one longer first projection for defining a respective slit and at least one shorter second projection between said first projection and said face for defining a respective cable-holding aperture;

(f) said shorter second projection being flexible independently of said longer first projection.

2. A guiding and marking member according to claim 1, wherein said aperture is so dimensioned that the respective shorter second projections by which it is defined lightly grip the inserted cable.

3. A guiding and marker member according to claim 1, wherein receptacles in which marking plates can be detachably latched are provided on the side of said support plate distal from said posts.

* * * * *